United States Patent [19]

Smitherman

[11] 4,084,436
[45] Apr. 18, 1978

[54] FUEL OIL LEVEL MEASURING APPARATUS

[75] Inventor: Ray C. Smitherman, Spencer, N.C.

[73] Assignee: RTR Incorporated, Spencer, N.C.

[21] Appl. No.: 636,758

[22] Filed: Dec. 1, 1975

[51] Int. Cl.² ........................................... G01F 23/12
[52] U.S. Cl. ................................. 73/313; 73/DIG. 5
[58] Field of Search ................. 73/313, DIG. 5, 311; 324/29.5

[56] References Cited

U.S. PATENT DOCUMENTS

| 1,185,985 | 6/1916 | Clewell | 73/311 |
| 1,735,023 | 11/1929 | Titcomb | 73/313 X |
| 3,200,645 | 8/1965 | Levins | 73/313 |
| 3,389,603 | 6/1968 | Jacobs | 73/DIG. 5 X |
| 3,473,381 | 10/1969 | Allen, Jr. | 73/313 |
| 3,678,750 | 7/1972 | DiNoia et al. | 73/313 |
| 3,685,357 | 8/1972 | Alexander | 73/313 |
| 3,872,886 | 3/1975 | Shotmeyer | 73/299 X |
| 3,916,691 | 11/1975 | Hollander et al. | 324/29.5 X |
| 3,976,963 | 8/1976 | Kübler | 73/313 X |

FOREIGN PATENT DOCUMENTS 1,343,130  1/1974  United Kingdom .................. 73/313

Primary Examiner—Richard C. Queisser
Assistant Examiner—John S. Appleman
Attorney, Agent, or Firm—Stevens, Davis, Miller & Mosher

[57] ABSTRACT

An apparatus for indicating the level of fuel in a fuel oil storage tank including a vertically positioned tube having a multiplicity of longitudinally spaced and movable floats therein and a multiplicity of associated reed switches and resistors positioned on the outside of the tube and spaced from each other. The switches are actuated by magnets on the associated floats, which rise and fall with the fuel level, and shunt varying amounts of current by the resistors so that a fuel level readout can be obtained on a meter.

7 Claims, 3 Drawing Figures

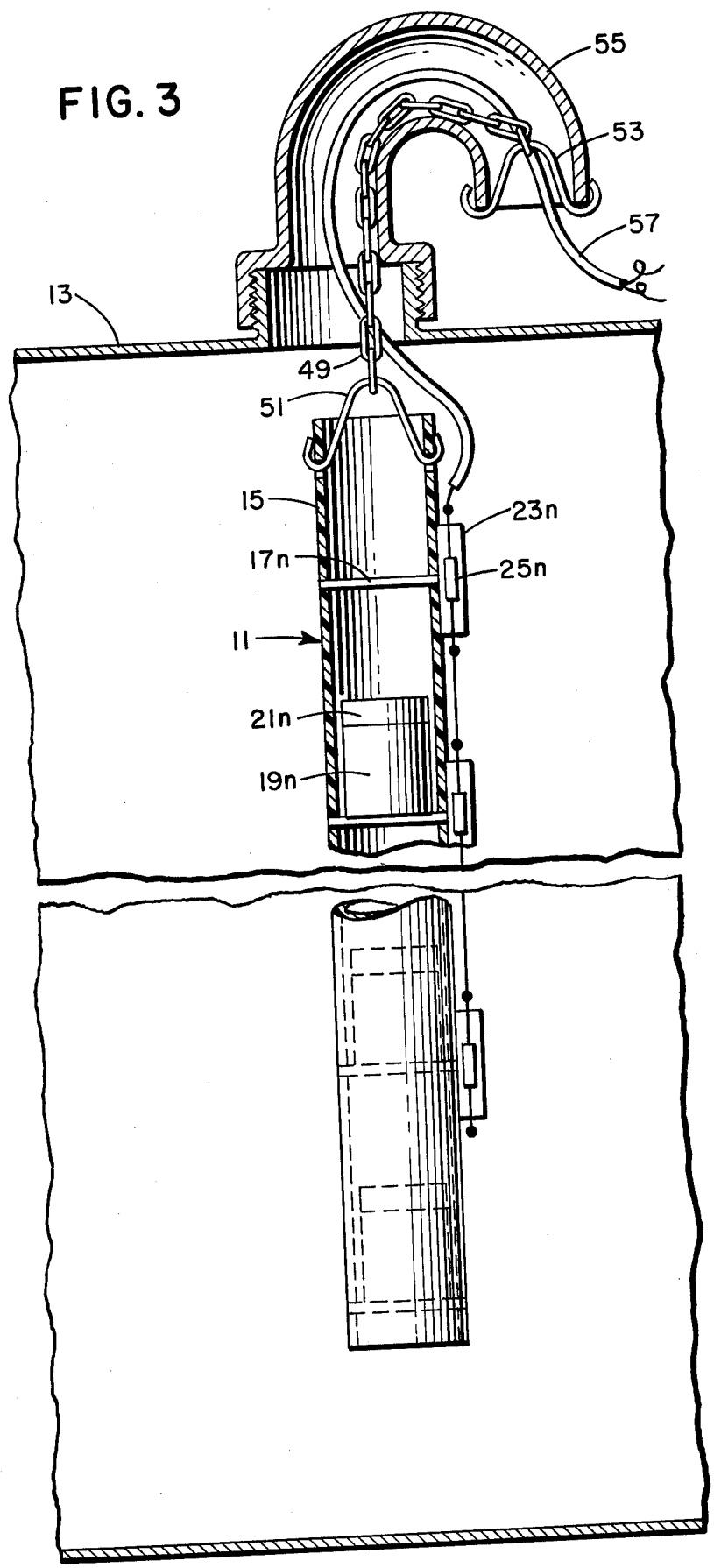

FUEL OIL LEVEL MEASURING APPARATUS

BACKGROUND OF THE INVENTION

I. FIELD OF THE INVENTION

This invention relates to an apparatus for indicating the level of fuel in a fuel oil storage tank, and more specifically to a fuel oil level sensing assembly which provides an accurate readout signal which can be read whenever desired from a meter. This invention is particularly adapted for use in home fuel oil storage tanks and gasoline service station storage tanks.

II. DESCRIPTION OF THE PRIOR ART

Various fuel oil level indicating apparatus have been disclosed which disclose reed switches actuated by a magnet. For example, U.S. Pat. No. 3,678,750 to DiNola et al discloses one such apparatus. The liquid level indicator system disclosed in that patent comprises a hermetically sealed vertical tube which contains a plurality of reed switches longitudinally aligned and connected in parallel and a plurality of resistors connected in series. The reed switches are actuated by a single float which extends about the exterior of the tube and which rises or falls according to the level of liquid in a tank. The magnetic element of the float closes the reed switches at the approximate level at which the float is located thereby short circuiting resistances in an electrical circuit in proportion to the amount of liquid present in the tank. The reed switches and resistors are inside the tube and the magnet is outside. Another such apparatus is shown in U.S. Pat. No. 3,200,645 to Levins. However, because of the relatively large number of reed switches, associated resistance elements and the hermetically sealed vertical tube which would be required if the apparatus were constructed for utilization in measuring the amount of fuel oil in a home oil fuel storage tank or a service station gasoline storage tank, such apparatus are necessarily complex in structure and costly in manufacture.

SUMMARY OF THE INVENTION

The present invention is concerned with improvements in apparatus for measuring fuel oil level in a tank and is intended to provide a fuel oil level measuring apparatus simple in structure and low in manufacturing cost which is extremely reliable and substantially maintenance free. The apparatus will be able to indicate to a consumer, whenever he desires, the level of fuel in his fuel oil storage tank.

The present invention comprises a vertically positioned tube having a multiplicity of longitudinally spaced and movable floats therein and a multiplicity of associated reed switches and resistors positioned on the outside of the vertical tube. The switches are actuated each by the magnet on the float associated therewith as the floats rise and fall with the fuel level, and shunt varying amounts of current by the resistors so that the fuel level readout can be obtained on a remote meter. The multiplicity of reed switches are connected in series to each other and in parallel each to an associated one of the series of the multiplicity of resistors. The only required sealing is that of the reed switches, each of which is encased in a plastic sleeve, the ends of which are filled with epoxy so as to be impervious to contact with fuel oil in the tank.

From the foregoing, it should be apparent that this invention has as one of its principal objects the provision of an apparatus for indicating the level of fuel oil in a fuel oil storage tank which enables a consumer to know at any time the level and amount of fuel oil in the tank.

It is a further object of this invention to provide a fuel oil level indicating apparatus which is simple in construction and operation.

It is still a further object of this invention to provide an apparatus for indicating the level of fuel oil in a tank which can be manufactured at relatively low cost so that it can be purchased by an ordinary customer for home use to assist him in conserving the amount of home fuel oil used. It is further intended that this invention be utilized by gasoline service stations to monitor the amount of liquid fuel in their gasoline storage tanks and to facilitate their allocation of the gasoline over a period of time if the demand for the gasoline should exceed the supply.

It is yet another object of this invention to provide an apparatus for indicating the level of fuel oil in an oil storage tank which produces an accurate reading whenever desired as the level of fuel oil decreases or increases within the tank.

It is another object of this invention to provide an apparatus for indicating the level of fuel oil in a fuel oil storage tank which conserves power by giving a fuel level read-out on a meter only when a switch is depressed.

BRIEF DESCRIPTION OF THE DRAWINGS

FIG. 3 is a vertical sectional view of another embodiment of the fuel oil level indicating apparatus positioned within a fuel storage tank.

DETAILED DESCRIPTION OF THE PREFERRED EMBODIMENT

Figure 1:
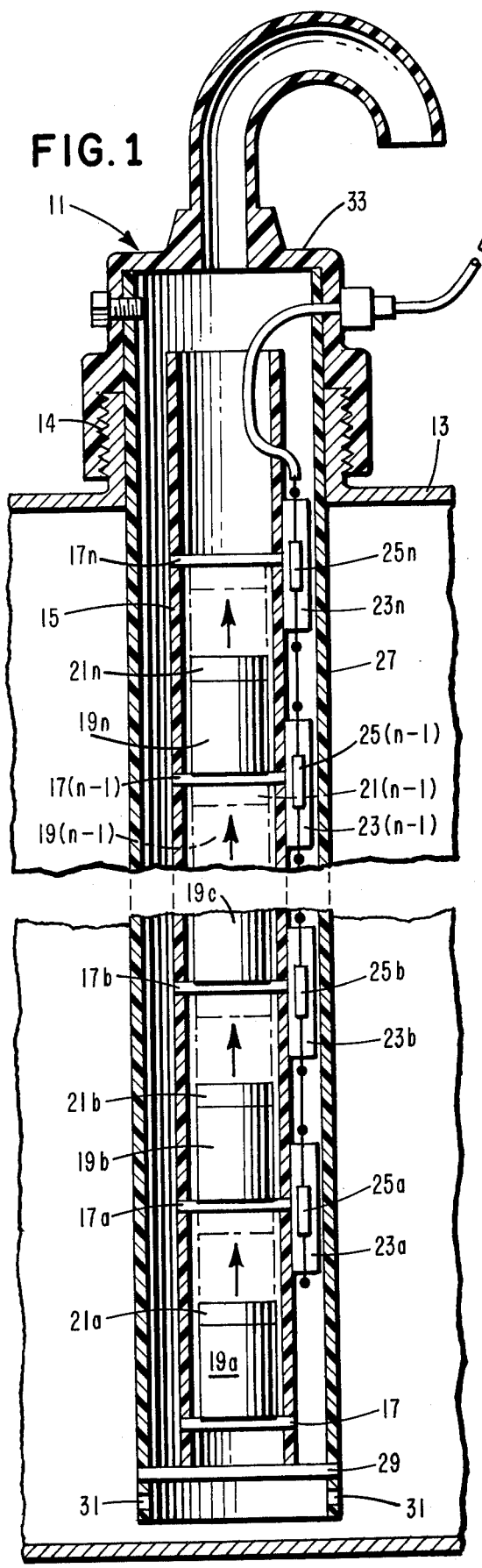
FIG. 1 is a vertical sectional view of the fuel oil level indicating apparatus embodying the present invention positioned within a fuel oil storage tank.

As shown in FIG. 1, a fuel oil indicating apparatus 11 is positioned in a fuel oil storage tank 13. The apparatus 11 comprises a substantially straight vertically extending tube 15 containing a plurality of pins 17, 17a, 17b, . . . 17 ($n-1$), 17n, which function as stops as will be subsequently described. The pins 17 through 17n are spaced, preferably, equidistantly, from each other along the vertical tube 15. The pins 17 extend transversely across the tube 15. Both ends of each pin 17 are positioned in apertures cut in the vertical tube 15 and are fixedly secured thereto. A plurality of vertically extending cork floats 19a through 19n are positioned within the tube 15. Each float 19 is positioned between a respective next adjacent pair of the stop pins 17 through 17n so as to have limited movement in the axial direction of the tube 15. A permanent magnet 21 is mounted on the upper end of each float 19. As fuel oil is introduced into the fuel oil storage tank 13, it will cause the plurality of floats 19a through 19n with which it is in contact to rise until stopped by the uppermost pin of the respective next adjacent pair of pins 17 between which the respective float is positioned. Consequently, the magnets 21 associated with the floats 19 are also held against the aforesaid uppermost pin 17.

A plurality of normally open reed switches 23a through 23n are mounted on the exterior of the tube 15 immediately adjacent each of the pins 17 except the lowermost as shown in FIG. 1. The reed switches 23 are electrically connected in series to each other. Each of the reed switches 23 is encased in a plastic sleeve (FIG. 1) filled with epoxy so as to be impervious to contact with fuel oil in the tank. A plurality of resistors 25a through 25n are mounted on the exterior of the vertical tube 15 immediately adjacent the pins 17 and the reed switches 23. The resistors 25 are electrically connected in series to each other. Each of the resistors 25 through 25n is electrically connected in parallel with a respective correspondingly lettered one of the plurality of reed switches 23a through 23n immediately there adjacent so as to be electrically connected thereto at a common terminal.

In the portion of the apparatus heretofore described, the floats 19 are of a cross section substantially equal to but of slightly less diameter than that of the tube 15 and are composed of cork. The magnets 21 positioned on top of the floats 19 are of an annular cross section substantially equal to that of the float.

The vertical tube 15 and associated components, both within and externally positioned, are surrounded by a protective vertical outer tube 27 which is positioned coaxially with respect to the first tube 15 and is substantially axially coextensive with the first tube 15. The first tube 15 and the protective outer tube 27 are both open at their lower end. When positioned in a fuel oil tank as shown in FIG. 1, the lower end of the protective outer tube 27 can rest on the bottom of the fuel oil tank 13. Therefore fuel oil can enter both the interior of the vertical tube 15 and the annular space between the vertical tube 15 and the protective outer tube 27. The components of the apparatus within the vertical tube 15 and positioned on the outer wall of the vertical tube 15 in the annular space between vertical tube 15 and the protective, coextensive outer tube 27 are not detrimentally affected by contact with and immersion in liquid fuel oil. Vertical tube 15 is supported by a pin member 29 which diametrically traverses the bottom end of the protective tube 27. Apertures 31 are located in the bottom end of the protective outer tube 27 so as to allow fuel oil to enter the protective tube 27 and the vertical tube 15 if the fuel oil measuring apparatus 11 is positioned flush against the bottom of the fuel oil storage tank 13.

A ventilated, threaded cap member 33 fits over the upper end of the protective outer tube 27 and is threadingly engaged to a fuel oil tank coupling 14 so as to position the fuel oil level indicating apparatus 11 in and secure it to the fuel oil storage tank 13. The fuel oil level indicating apparatus 11 positioned within the fuel oil storage tank 13 is electrically connected as shown in the figures to a remote readout meter 35. The meter 35 reflects the amount of current flowing through the circuit and this is determined by the level of the fuel oil in the fuel oil storage tank 13 which affects all of the floats 19 within the vertical tube 15 up to the fuel level. Each of the magnets on these floats, having risen until stopped by the uppermost of the next adjacent pair of pins 17 through 17n between which it is positioned, have actuated the reed switches 23 adjacent each of the pins 17 through 17n causing the current to bypass the associated resistor 25.

Figure 2:
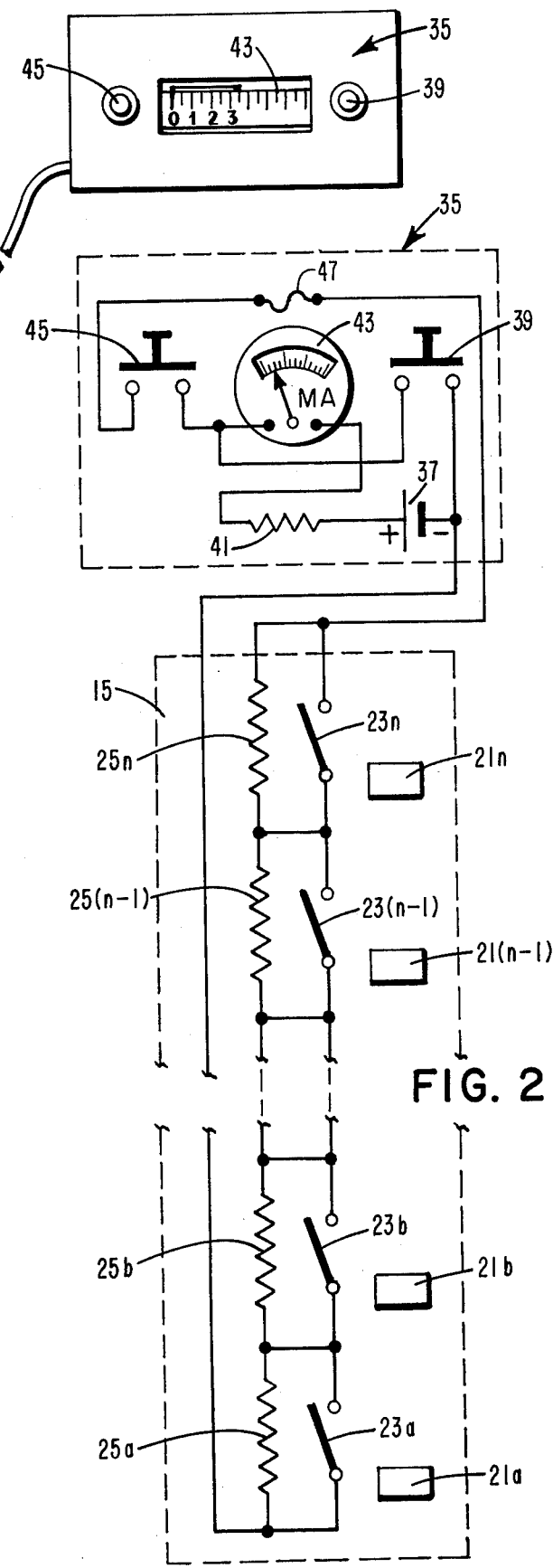
FIG. 2 is a simplified schematic diagram of the circuitry embodied in the apparatus of the present invention.

As shown in FIG. 2 and as noted above, all of the resistors 25 are connected in series, all of the reed switches 23 are connected in series and each resistor 25 is connected in parallel to each correspondingly lettered reed switch 23 immediately there-adjacent. The reed switches 23 are in their normally open unactuated position since the magnets 21 are all in their lower position as they would be if the fuel oil storage tank 13 were empty.

The remote metering device 35, indicated in the schematic diagram in FIG. 2, comprises a voltage source measurement circuit for determining the strength of a voltage source. In the preferred embodiment, the voltage source comprises a battery 37. The voltage source measurement circuit comprises a switch 39, the battery 37, a 150 ohm resistor 41 and a 10 milliamp meter 43 connected in series so as to determine the level of voltage of the voltage source battery 37. This circuit is utilized to ascertain the strength of the voltage source 37 and thus the accuracy of the fuel oil level measuring apparatus.

A second switch 45 is connected in series to a 100 milliamp fuse 47, the series of reed switches 23 each of which is in parallel relationship to a respective one of a series of resistors 25, the power source 37, the 150 ohm resistor 41, and the meter 43 so as to complete a circuit when depressed. Thus, the switch 45 is utilized to ascertain a reading on the remote meter 43 as to the level of fuel oil in a fuel oil storage tank 13 in which the apparatus 11 is positioned.

In a preferred embodiment there are eleven pins 17 through 17j, ten floats 19a through 19j, ten magnets 21a through 21j, ten reed switches 23a through 23j and ten resistors 25a through 25j. The series of ten resistors 25 in a preferred embodiment of the fuel oil level measuring apparatus vary in resistance from the top to the bottom of the vertical tube as follows: 25n or 25j (16 ohms); 15 (n−1) or 25i (21 ohms); 25h (27 ohms); 25g (36 ohms); 25f (50 ohms); 25e (75 ohms); 25d (125 ohms); 25c (250 ohms); 25b (750 ohms); and 25a (1500 ohms).

In operation, as fuel oil is introduced into the fuel oil storage tank 13, the fuel oil rises from the bottom of the fuel oil storage tank 13 and simultaneously is introduced into the fuel oil level indicating apparatus 11 through the aperture 31 located at the bottom of the protective outer tube 27 or by the positioning of the outer tube 27 above the bottom of the fuel oil storage tank 13. Therefore, as the fuel oil level rises within the fuel oil storage tank 13, it simultaneously rises within the annular space between vertical tube 15 and the protective outer tube 27 and the space within vertical tube 15. As the level of fuel oil rises within the fuel oil level measuring apparatus 11, it will sequentially lift the floats 19a through 19n, i.e., from the lowermost to the uppermost. For instance, as the fuel oil comes in contact with the lowermost float 19a within the vertical tube 15, the float 19a will rise due to its buoyant nature until stopped by the uppermost pin 17a of the two pins 17, 17a between which it is positioned. Upon reaching the position in which it is stopped by the uppermost pin 17a, the magnet 21a located on the upper end of that float 19a actuates reed switch 23a adjacent to the pin 17a and located on the outside wall of the tube 15. The normally open reed switch 23a is closed by the magnetic field of the magnet 21a and shunts the electrical current which would normally flow through the parallel connected resistor 25a through the reed switch 23a. As the level of fuel oil continues to rise within the fuel oil storage tank 13, the first float 19a and the attached magnet 21a will stay in its uppermost position and maintain the associated reed switch 23a in a closed position bypassing the parallel connected resistor 25a. When the fuel oil level reaches the next float 19b and connected magnet 21b, with the associated reed switch 23b, and parallel connected resistor 25b, the same sequence of events will occur. The float 19b will rise until stopped in its uppermost position by the uppermost pin 17b of the pair of pins 17a, 17b between which it is positioned, float 19b and the attached magnet 21b will close the normally open reed switch 23b and bypass the parallel connected resistor 25b. This unit will also continue to maintain this position as the level of fuel oil further rises and affects subsequent floats 19c-19n within the vertical tube 15 and their associated reed switches 23c-23n and parallel resistors 25c-25n. The bypassing of each resistor associated with its adjacent float causes greater flow of current within the electrical circuit which can be indicated on the meter 43 when the switch 45 completes the circuit described above. A larger or lesser current flow correspondingly moves the needle on the remote meter 35 to indicate a greater or lesser amount, respectively, of fuel oil within the fuel oil storage tank 13. The second switch 39 can be actuated which completes the secondary circuit and measures the strength of the voltage source 37 which would normally be a battery.

Conversely as the fuel oil level decreases within the fuel oil storage tank 13, it simultaneously decreases within the annular space between vertical tube 15 and the protective outer tube 27 and the space within vertical tube 15. As the level of fuel oil decreases within the fuel oil level measuring apparatus 11, it will sequentially drop the floats 19n through 19a, i.e., from the uppermost to the lowermost. For instance, as the fuel oil surrounding float 19n drops within the vertical tube 15, the float 19n will drop until stopped by the lowermost pin 17 $(n-1)$ of the two pins 17n, 17 $(n-1)$ between which it is positioned. Upon reaching the position in which it is stopped by the lowermost pin 17 $(n-1)$, the magnet 21n located on the upper end of that float 19n deactuates reed switch 23n adjacent to pin 17n and located on the outside wall of the tube 15. The normally open reed switch 23n is open since it is not affected by the magnetic field of the magnet 21n and shunts the electrical current which would normally flow through the reed switch 23n through the parallel connected resistor 25n. As the level of fuel oil continues to fall within the fuel oil storage tank 13, the top float 19n and the attached magnet 21n will stay in its lowermost position and allow the associated reed switch 23n to remain in an open position so that it is bypassed by the parallel connected resistor 25n. When the fuel oil level drops to the next float 19 $(n-1)$ and connected magnet 21 $(n-1)$, with the associated reed switch 23 $(n-1)$, and parallel connected resistor 25 $(n-1)$, the same sequence of events will occur. The float 19 $(n-1)$ will fall until stopped in its lowermost position by the lowermost pin 17 $(n-2)$ of the pair of pins 17 $(n-1)$, 17 $(n-2)$ between which it is positioned, float 19 $(n-1)$ and the attached magnet 21 $(n-1)$ will allow the normally open reed switch 23 $(n-1)$ to open and be bypassed by the parallel connected resistor 25 $(n-1)$. This unit will also continue to maintain this position as the level of fuel oil further falls and affects subsequent floats 19 $(n-2)$ and 19a within the vertical tube 15 and their associated reed switches 23 $(n-2)$-23a and parallel resistors 25 $(n-2)$-25a. The bypassing of each reed switch associated with its adjacent float causes lesser flow of current within the electrical circuit which can be indicated on the meter 43 when the switch 45 completes the circuit described above. A larger or lesser current flow correspondingly moves the needle on the remote meter 35 to indicate a greater or lesser amount, respectively, of fuel oil within the fuel oil storage tank 13. The second switch 39 can be actuated which completes the secondary circuit and measures the strength of the voltage source 37 which would normally be a battery.

For example, if tube 15 advantageously contained ten floats 19 as pointed out above, each with an adjacent reed switch 23 and parallel connected resistors 25, the fuel oil level indicating apparatus 11 would indicate the amount of fuel in a fuel oil storage tank 13 by dividing the capacity of the fuel storage tank 13 into tenths. Thus, the fuel oil level indicating apparatus 11 would be at all times accurate to within one tenth of the total capacity of the fuel oil storage tank 13. The choice of ten floats 19 is further advantageous since the level of fuel oil can be indicated in increments of one tenth on the meter 43 and most people can easily associate the division of whole into tenths particularly with the increasing use of the metric system.

The 1.5 volt battery 37 and the 250 ohm resistor 41 in series with the meter 43 restricts the flow of current to 10 milliamps which negates any fire hazard due to the low current flow through the circuit.

As shown in FIG. 3, another embodiment of the fuel oil level indicating apparatus 11 is positioned in a fuel oil storage tank 13. The embodiment is similar to the FIG. 1 embodiment except that the protective vertical outer tube and the ventilated threaded cap member are not utilized so as to simplify the construction and installation of the apparatus. Instead, the apparatus is positioned within a fuel oil storage tank by a chain 49 fastened at one end to a first hook member 51 which is attached to the top of the tube 15 and fastened at the other end to a second hook member 53. The second hook member 53 is attached to the outermost rim of a vent 55 of the fuel oil storage tank so as to provide support for the apparatus suspended therein. As shown in FIG. 3 the apparatus is suspended by the chain 49 so as to hang a short distance, for example approximately four inches, from the bottom of the fuel tank. It should also be noted that the wires 57 electrically connecting the fuel level measuring apparatus and the remote metering device are also placed within the existing vent so as to simplify installation of the apparatus in a fuel oil storage tank. The cork floats 19 with mounted magnets 21, pins 17, reed switches 23, resistors 25 and remote metering device 35 function exactly as those described in the first embodiment. All other parts of the FIG. 3 embodiment are exactly the same as those in the FIG. 1 embodiment.

From the above, it should be evident that the apparatus of this invention is simple of construction and virtually maintenance free. The entire fuel oil measuring apparatus 11 is constructed so as to allow fuel oil to come in contact with and flow through the apparatus without any detrimental effect upon it or its performance. This is in contrast with many other liquid level indicating devices which comprise hermetically sealed, vertical tubes protecting their electrical components which would be damaged if the devices were to develop a leak due to a defect in construction or with damage due to the passage of time. The only hermetically sealed components of the fuel oil level indicating apparatus 11 are the reed switches 23 which are located in a plastic sleeve and sealed at the ends with an epoxy in a simple and foolproof manner. Another advantage of the fuel oil measuring apparatus 11 is that only a few reed switches 23, in our preferred embodiment ten, can be utilized along a substantial longitudinal length and still provide an accurate read-out on the meter 43 whenever desired.

It will thus be seen that there is provided by this invention an extremely simple means of indicating the level of fuel oil storage tank without any danger of flammability and without any maintenance concern due to sophisticated construction. The installation of this apparatus is simple and the construction cost should be modest.

I claim as my invention:

1. An apparatus for indicating the level of fuel oil in a fuel oil storage tank, said apparatus comprising:
    a substantially vertically extending substantially straight conduit;
    a plurality of stop means, each of said stop means extending inwardly from the interior wall of said conduit, said stop means being spaced from each other along said conduit;
    a plurality of floats positioned in said conduit, each float being positioned between a respective pair of next adjacent ones of said plurality of said stop means;
    a plurality of magnets each of which is mounted on a respective one of said floats;
    a plurality of reed switches electrically connected in series to each other, each of said reed switches being mounted on the exterior of said conduit immediately adjacent and having a portion vertically coextensive with a respective one of said stop means;
    a plurality of resistors electrically connected in series to each other, each of said resistors being electrically in parallel with a respective one of said plurality of reed switches; and
    a meter electrically connected to said reed switches and said resistors so that as the level of fuel oil in a fuel oil storage tank in which said conduit is positioned, rises, each of said floats and magnets thereon successively, from the lowermost to the uppermost, rises and actuates the reed switch adjacent one of the two stop means between which it is positioned whereby said meter can indicate that the level of fuel oil is adjacent that reed switch and as the level of fuel oil falls, each of said floats and magnets thereon successively, from the uppermost to the lowermost, falls and deactuates the reed switch adjacent one of the two stop means between which it is positioned whereby said meter can indicate that the level of fuel oil is no longer adjacent that reed switch.

2. An apparatus as claimed in claim 1, wherein each of said resistors is mounted adjacent a respective one of said plurality of stop means.

3. An apparatus for indicating the level of fuel oil in a fuel oil storage tank, said apparatus comprising:
    a substantially vertically extending substantially straight conduit;
    a plurality of stop means, each of said stop means extending inwardly from the interior wall of said conduit, said stop means being spaced from each other along said conduit;
    a plurality of vertically extending floats positioned in said conduit, each float being positioned between a respective pair of next adjacent ones of said plurality of stop means;
    a plurality of magnets, each of which is mounted on the upper end of a respective one of said floats;
    a plurality of normally open reed switches electrically connected in series to each other, each of said reed switches being mounted on the exterior of said conduit immediately adjacent and having a portion vertically coextensive with a respective one of said stop means;
    a plurality of resistors electrically connected in series to each other, each of said resistors being mounted on the exterior of said conduit immediately adjacent a respective one of said stop means, each of said resistors being electrically connected in parallel with a respective one of said plurality of reed switches; and
    a meter electrically connected to said reed switches and said resistors so that as the level of the fuel oil, in an oil storage tank in which said conduit is positioned, rises, each of said floats and magnets thereon successively, from the lowermost to the uppermost, rises and is stopped by the uppermost one of the pair of stop means between which it is positioned and closes the respective reed switch adjacent that stop means whereby said meter can indicate that the level of fuel oil is adjacent that reed switch and as the level of fuel falls, each of said floats and magnets thereon successively, from the uppermost to the lowermost, falls away from the uppermost one of the pair of stop means between which it is positioned and opens the respective reed switch adjacent that stop means whereby said meter can indicate that the level of fuel oil is no longer adjacent that reed switch.

4. An apparatus for indicating the level of fuel oil in a fuel oil storage tank, said apparatus comprising:
    a substantially vertically extending substantially straight tube;
    a plurality of stop means, each of said stop means extending inwardly from the interior wall of said tube, said stop means being spaced along said tube;
    a plurality of vertically extending floats of a cross section substantially equal to but of slightly less diameter than that of the tube, each float being positioned between a respective pair of next adjacent ones of said plurality of stop means;
    a plurality of magnets of annular cross section substantially equal to that of said floats, each of said magnets being mounted on the upper end of a respective one of said floats;
    a plurality of normally open reed switches electrically connected in series to each other, each of said reed switches being mounted on the exterior of the said tube immediately adjacent and having a portion vertically coextensive with a respective one of said stop means;
    sealant means for hermetically sealing each of said reed switches against contact of fluid therewith;
    a plurality of resistors electrically connected in series to each other, each of said resistors being mounted on the exterior of said tube immediately adjacent and having a portion vertically coextensive with a respective one of said stop means, each of said resistors being electrically connected in parallel with a respective one of said plurality of reed switches; and
    a meter electrically connected to said reed switches and said resistors so that as the level of fuel oil in an oil storage tank in which said tube is positioned, rises, each of said floats and magnets thereon successively, from the lowermost to the uppermost, rises and is stopped by the uppermost one of the pair of stop means between which it is positioned and closes the respective reed switch adjacent that stop means, whereby said meter can indicate that the level of fuel oil is adjacent that reed switch, and as the level of oil falls each of said floats and magnets thereon successively, from the uppermost to the lowermost, falls away from the uppermost one of the pair of stop means between which it is positioned and opens the respective reed switch which is adjacent that stop means, whereby said meter can indicate that the level of fuel oil is no longer adjacent that reed switch.

5. An apparatus as claimed in claim 4, wherein each of said stop means comprises a pin which extends completely traversely across the interior of said tube.

6. An apparatus as claimed in claim 4, wherein each of said plurality of resistors is positioned immediately adjacent the respective one of said plurality of reed swtiches with which that resistor is electrically connected in parallel.

7. An apparatus as claimed in claim 4, wherein each of said resistors has a resistance less than the resistance of any of the other resistors which are more remote from the upper end of the tube than that resistor.

* * * * *